(12) United States Patent
Herman et al.

(10) Patent No.: US 6,471,520 B1
(45) Date of Patent: Oct. 29, 2002

(54) MODEL OF COMPLEX STRUCTURE AND METHOD OF MAKING THE SAME

(75) Inventors: Timothy M. Herman, Wauwatosa, WI (US); Vito R. Gervasi, St. Francis, WI (US); Thomas E. Bray, Milwaukee, WI (US); Deborah S. Adler, Milwaukee, WI (US)

(73) Assignee: Milwaukee School of Engineering, Milwaukee, WI (US)

( * ) Notice: Subject to any disclaimer, the term of this patent is extended or adjusted under 35 U.S.C. 154(b) by 0 days.

(21) Appl. No.: 09/439,324

(22) Filed: Nov. 12, 1999

Related U.S. Application Data

(60) Provisional application No. 60/108,312, filed on Nov. 13, 1998.

(51) Int. Cl.$^7$ .............................................. G09B 23/26
(52) U.S. Cl. ...................................... 434/278; 434/277
(58) Field of Search ................................ 434/277, 276, 434/278, 279; 164/71.1

(56) References Cited

U.S. PATENT DOCUMENTS

| | | | |
|---|---|---|---|
| 4,184,271 A | * | 1/1980 | Barnett ........................ 434/278 |
| 4,325,698 A | | 4/1982 | Darling et al. |
| 4,348,190 A | | 9/1982 | Barrett |
| 4,398,888 A | | 8/1983 | Darling et al. |
| 4,416,635 A | | 11/1983 | Smith |
| 4,622,014 A | | 11/1986 | Mikelsaar |
| 4,702,702 A | | 10/1987 | Mikelsaar |
| 4,812,128 A | | 3/1989 | Mikelsaar |
| 4,906,122 A | | 3/1990 | Barrett et al. |
| 5,030,103 A | | 7/1991 | Buist et al. |
| 5,189,781 A | * | 3/1993 | Weiss ........................ 29/527.2 |
| 5,265,030 A | * | 11/1993 | Skolnick ..................... 364/496 |
| 5,296,688 A | * | 3/1994 | Hamilton .................... 235/375 |
| 5,555,366 A | | 9/1996 | Teig et al. |
| 5,583,973 A | | 12/1996 | DeLisi et al. |
| 5,622,216 A | * | 4/1997 | Brown ....................... 164/71.1 |
| 5,779,833 A | * | 7/1998 | Cawley .................... 156/89.11 |
| 5,824,250 A | * | 10/1998 | Whalen ....................... 264/219 |
| 5,869,170 A | * | 2/1999 | Cima ....................... 428/304.4 |
| 5,893,404 A | * | 4/1999 | Mendez ...................... 164/71.1 |
| 6,117,612 A | * | 9/2000 | Halloran ..................... 430/269 |
| 6,129,872 A | * | 10/2000 | Jang ............................. 264/75 |
| 6,139,574 A | * | 10/2000 | Vacanti ....................... 623/1.44 |

FOREIGN PATENT DOCUMENTS

| | | | | |
|---|---|---|---|---|
| EP | 0691194 A | * | 1/1996 | ................. 395/120 |
| EP | 0 691 194 A1 | | 10/1996 | |

OTHER PUBLICATIONS

Bailey, M.J., Schulten, K. and Johnson, J.E. (1998) The use of solid physical models for the study of macromolecular assembly. Curr. Opin. in Struct. Biol. 8, 202–208.

Dodson, G. (1986) Protein crystallography and its new revolution. T.I.B.S. 11, 309–310.

Hall, S.S. (1994) Protein images update natural history. Science 267, 620–624.

Rubin, B. and Richardson, J.S. (1972) The simple construction of protein alpha–carbon models. Biopolymers 11, 2381–2385.

* cited by examiner

Primary Examiner—Derris H. Banks
Assistant Examiner—Kurt Fernstrom
(74) Attorney, Agent, or Firm—Michael Best & Friedrich LLP

(57) ABSTRACT

A solid free form model of a complex structure, such as a molecular structure, and a method of making such a model. The model includes a first elongated strand extending along a first path corresponding to the locations of selected elements to represented, a second elongated strand extending along a second path spaced from the first path and a connecting leg extending between the first and second strands along a path corresponding to the vector along which a force, such as a hydrogen bond, acts on the modeled elements.

13 Claims, 4 Drawing Sheets

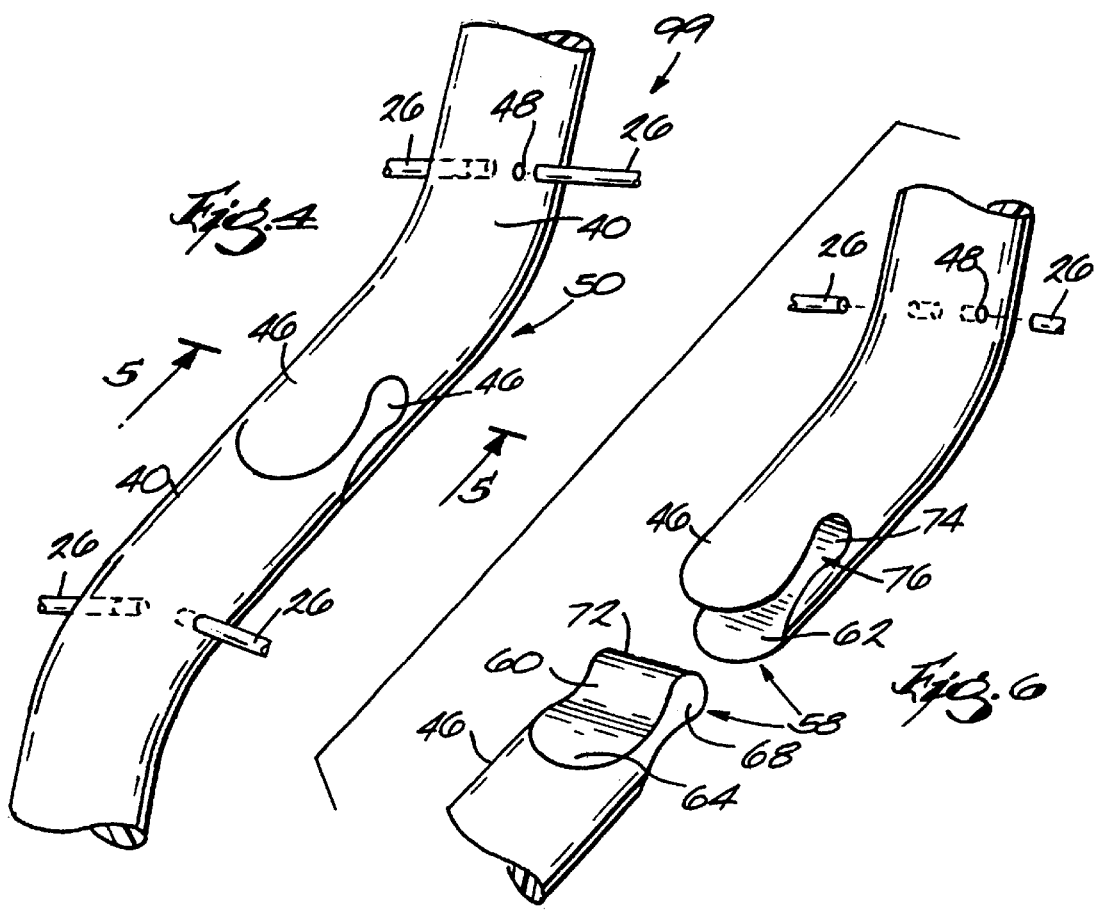
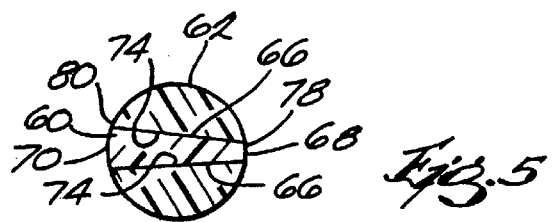
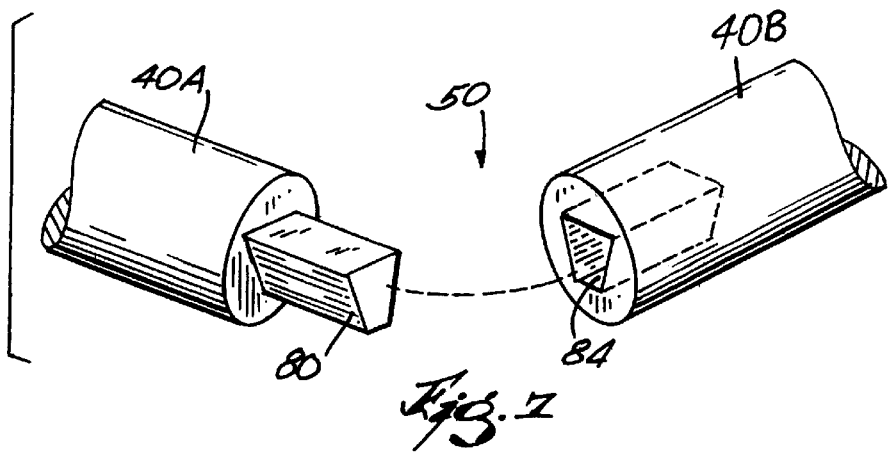

MODEL OF COMPLEX STRUCTURE AND METHOD OF MAKING THE SAME

This application claims the benefit of provisional application No. 60/108,312 filed on Nov. 13, 1998.

BACKGROUND OF THE INVENTION

1. Technical Field

The invention relates generally to three-dimensional physical models of complex structures, and more particularly to three-dimensional physical models of molecular structures and methods of manufacturing such models.

2. Background Prior Art

The study of molecular structure and function is at the core of modern biology, and shapes much of biological research. Images of newly solved structures are appearing at an ever increasingly rate in science journals weekly and the rate is increasing, as structural biology becomes a mainstream science. At the same time that understanding of molecular structures has increased, methods to model and communicate understanding of these structures has not.

A number of different types of molecular model construction are known and used to represent molecular structures and to study the interaction between a large molecule, such as an enzyme, and its substrate. Many of the models currently in use are the well known. For example, it is known to use ball and stick models in which balls representing atoms are connected by rigid or flexible connectors representing chemical bonds. Using such models it is possible by tedious manual construction to assemble space filling representations of complex molecules.

Other known molecular models currently in use include space filling individual components fabricated of plastic or other rigid material representing the space filling nature of individual molecular structures. These models must also be individually assembled from construction units representing single atoms, involving tedious manual manipulation by highly skilled personnel. One reason why skilled personnel are sometimes needed to assemble molecular structure representations from known modeling kits is that the modeling kits include many parts that can be assembled in a variety of arrangements. Due to the flexibility of the kit a model can be assembled incorrectly, thus inaccurately representing the structure of the subject molecule. A skilled person having knowledge of the subject structure's configuration is therefore needed to accurately assemble the model.

Information technology also provides one type of readily available computer-generated, virtual model of complex structures through the generation of interactive computer images. Although the image created on the computer screen is two-dimensional, various shading, depth cueing and kinetic depth effects can produce an image that takes on three-dimensional character when the model appears to rotate on the screen. Although these computer visualization programs were originally developed for UNIX-based computer workstations, versions now exist for use in desktop computer (PC or Mac) environments. Once such program, RasMol, is publicly available software. An extensive molecular structure database exists at the Protein Data Bank web site (http//www.rcsb.org/pdb) which can be downloaded and used with RasMol, or in the RasMol-based Chime software using the down-loaded data permits virtual modeling of the molecular structures.

The following prior art references disclose a variety of model constructions and techniques used for the modeling of complex structures, such as molecular models.

| Patent No. | Issue Date | Inventor |
| --- | --- | --- |
| 5,555,366 | September 10, 1996 | Teig et al. |
| 5,030,103 | July 9, 1991 | Buist et al. |
| 4,906,122 | March 6, 1990 | Barrett et al. |
| 4,812,128 | March 14, 1989 | Mikelsaar |
| 4,702,702 | October 27, 1987 | Mikelsaar |
| 4,622,014 | November 11, 1986 | Mikelsaar |
| 4,416,635 | November 22, 1983 | Smith |
| 4,398,888 | August 16, 1983 | Darling et al. |
| 4,348,190 | September 7, 1982 | Barrett |
| 4,325,698 | April 20, 1982 | Darling et al. |
| 4,184,271 | January 22, 1980 | Barnett |

SUMMARY OF THE INVENTION

Although computer-generated images can be used by experienced users to view molecular structure in great detail, these virtual models are often unavailable in classrooms and other facilities without computers. Moreover, even when such virtual modeling apparatus is available, the virtual models can be unappreciated by those who have no previous experience with either the modeling software or the molecular structure. For these individuals, physical models provide a tangible object to which users can relate in a tactile manner. In general, a three-dimensional model of complex structures assists in gaining a more complete understanding of the functional consequences of the three-dimensional structure.

Also, physical models are a necessary complement to, not a substitute for, computer-aided visualization. While interactive computer-generated images are much superior to static, two-dimensional pictures, this technology does not naturally facilitate group discussion. Only one person controls the computer "model", and it is often difficult for inexperienced students to visualize the three-dimensional character of these computer-generated images. However, a physical model can be thought of as the ideal portable, three-dimensional, graphical display. Unlike a computer-generated image, it is always "on"; and be shared among multiple users quickly and easily. Thus there is a need for accurate, affordable physical models of biological structures.

In one embodiment, the invention provides an affordable, easy-to-use, accurate three-dimensional model of a complex structure, such as a molecule or chain of molecules, that can be used to study the structure and its function, as well as a method to manufacture the three-dimensional model. More particularly, in one embodiment, the invention provides a three-dimensional model of a complex structure including a backbone representation of a series of predetermined elements interconnected by representations of bonds extending between the predetermined elements.

In another aspect, the invention provides a method of making a three-dimensional model through the application of rapid prototyping technology, particularly Solid Freeform Fabrication (SFF) techniques. The use of such techniques is particularly well-suited to the production of physical models of the complex geometry found in molecular structures. The complex geometry found in three-dimensional protein structures precludes the use of subtractive manufacturing methods as found in traditional numerical control machining. However, these complex structures can be produced by the additive manufacturing processes employed by SFF prototyping technologies.

Although physical models produced by rapid prototyping technologies have all the properties required to be useful as instructional aids in science education, the use of rapid prototyping technologies alone is not feasible because such techniques are too slow and costly to produce molecular models in large numbers.

Accordingly, in another embodiment, the invention provides a method of manufacturing a model of a complex structure, such as a molecular model, including steps that afford use of relatively inexpensive processes such as injection molding. In particular, the invention also provides a method of making a three-dimensional model including the use of rapid prototyping techniques to divide the model into a series of segments that can be more easily manufactured than the model as a whole and that can be assembled by persons without any particular knowledge of the molecular structure and without any particular or special modeling skills.

Another aspect of the invention is the provision of a model including a plurality of model elements or segments that each have interconnecting fittings which are configured to engage only the appropriate adjacent segments, i.e., the segments fit together in only one way, so that the model as a whole can be constructed without foreknowledge of the modeled structure and without any special training. The configurations of the segments and the interconnecting fittings are also amenable to injection molding.

The invention thus provides several advantages. First, the invention provides a model of a complex structure, such as a molecular structure, divided into a series of short segments each of which possess a simple geometry. The model segments afford production by injection molding and have uniquely configured connectors built into the ends of the segments, allowing contiguous segments to be joined together to create the model. The invention also provides a method of making the model in an accurate, cost effective manner, and a method for representing covalent bonds which act in the molecular structure by the use of structural elements initially formed through the use of rapid prototyping techniques.

Other features and advantages of the invention will become apparent to those skilled in the art upon review of the following detailed description, claims and drawings.

BRIEF DESCRIPTION OF THE DRAWINGS

FIG. 4 is perspective view of a portion of a model that is an alternative embodiment of the model shown in FIG. 1.

FIG. 5 is a view taken along line 5—5 in FIG. 4.

FIG. 6 is a perspective view of the segments shown in FIG. 4 in a separated arrangement.

FIG. 7 is a perspective view of two model segments which are an alternative embodiment of the segments shown in FIG. 4.

Figure 1:
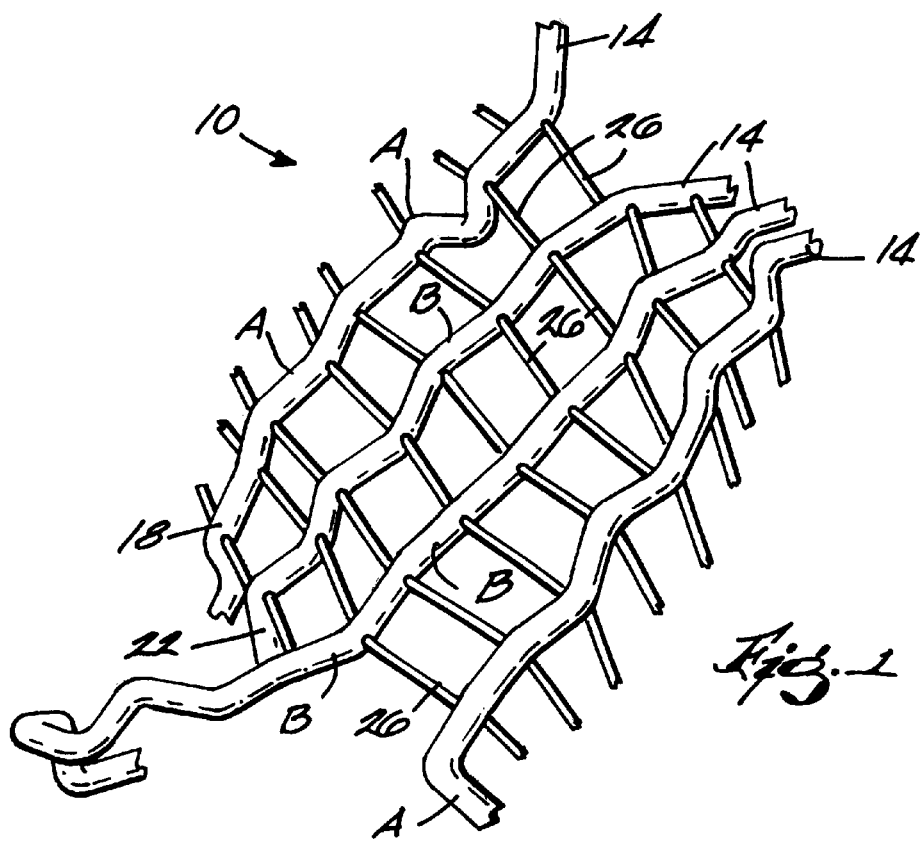
FIG. 1 is a perspective view of a model of a complex structure embodying the present invention.
Figure 2:
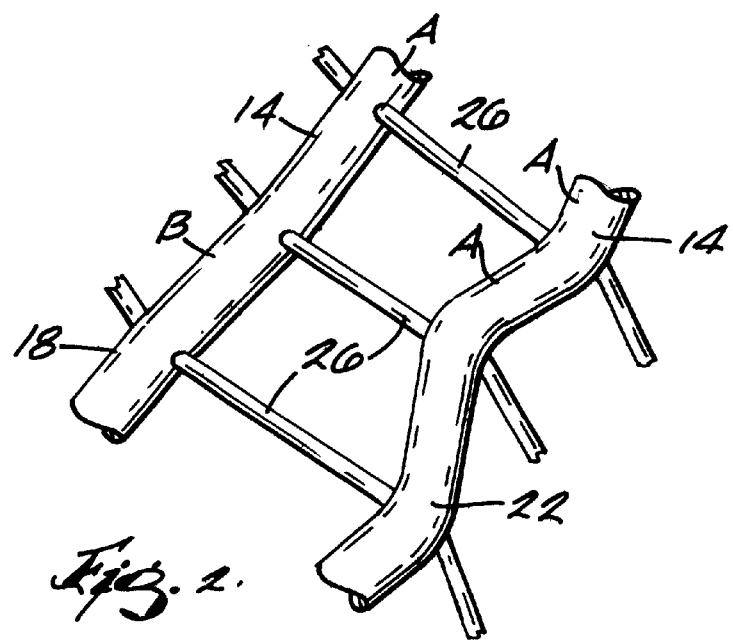
FIG. 2 is an enlarged view of a portion of the model shown in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The drawings illustrate a preferred embodiment of a model and method of making the model which embody the invention. First the structure of the model is discussed and then a preferred method for making the model is discussed.

Referring first to FIG. 1, FIG. 1 illustrates a model 10 of a complex structure, such as a portion of a molecular structure. While the model 10 is useful for representing the configuration of a variety of complex structures, including both microscopic structures and structures of a large scale, for the purposes of simplicity and description the illustrated model 10 represents a portion of a protein. Proteins are polymers composed a variety of amino acids, each of which has a central or "alpha" carbon atom. The amino acids are monomers interconnected by covalent bonds. The model 10 includes structure representing the relative locations of a chain of alpha carbons in the respective amino acids, and structure representing the forces of the covalent bonds acting on the amino acids. Again, other structures or attributes of the subject structure represented by the model can be successfully used as critical locations or data points for the purpose of modeling. However, the present description uses alpha carbons of a protein as the critical structure or data points to illustrate one type of model of a complex structure. Those of ordinary skill in the art will readily understand that other complex structures, their attributes, and desired use of the model can be considered in successfully modeling or presenting the subject structure.

To represent the protein's structure, the model 10 includes a plurality of elongated, tubular strands 14. The strands 14 have portions that are curved, bent, twisted or straight, depending on the subject represented by the model. In the illustrated model 10, the bends (indicated by reference letter "A") in the strands 14 tend to indicate the location of an alpha carbon. The strands 14 also have relatively straight sections extending between the bends A. The straighter portions (indicated by the reference letter: "B") of the strands 14 represent covalent bonds acting along a vector extending between the alpha carbons. The tubular strands 14 are interconnected to form an alpha carbon backbone model.

The backbone model 10 thus represents the relative position in three-dimensional space of selected elements, namely alpha carbons, and represents the covalent bonds acting on the alpha carbons. As explained below, each of the strands 14 follows a path corresponding to the locations of a series of alpha carbons interconnected by covalent bonds. In the model shown in FIG. 1, a first strand 18 extends along a first path corresponding to a first set of data points or elements, i.e., alpha carbons. The model 10 also includes a second strand 22 extending along a second path delineated by a second set of data points or elements. This representation of the protein molecule's structure delineates the backbone of the modeled protein, i.e., shows the basic shape and structure of the protein, and is therefore a useful three-dimensional representation of the protein's configuration.

The model 10 also includes a plurality of relatively thin connecting legs 26 which extend between and connect adjacent strands 14 and which represent respective hydrogen bonds in the subject protein. More particularly, hydrogen bonds in a protein's molecular structure can be a significant force determining the form and stability of the protein. Often such hydrogen bonds are created by a shared hydrogen atom located between closely spaced amino acids. For the purpose of modeling, the thin legs 26 are used to represent the effect of a hydrogen bond acting on the amino acids, and extend between the portions of adjacent strands at locations representing the alpha carbons of adjacent strands 14. The connecting legs 26 each extend along a path corresponding to the vector along which the force of hydrogen bond acts on a pair of selected structural elements, e.g., a pair of alpha carbons.

Other molecular structures can be represented by the model 10 but are not shown. For example, side chains extending from the central carbons can be represented on an atom-by-atom basis if desired, by identifying, locating and interconnecting the atoms in the side chain with the appropriate position of the backbone model. Similarly, in the case of proteins, it is often desirable to identify particular substrates or inhibitors which can interact with the modeled protein. Such complex structures can either be included as an integral part of the modeled protein or created as a separately modeled complex structure.

The method for producing the model 10 preferably includes the use of one of several known rapid prototyping technologies or SFF technologies. These techniques can be effectively used to produce accurate alpha-carbon backbone models of protein structures, including representations of the effect of hydrogen bonds. These techniques can be used to fabricate the backbone models using a numerical description of the molecule to be modeled expressed in a three-dimensional space. Such a publicly available description in an x, y, z, format can be obtained for many proteins and other molecular structures from the Protein Data Bank (http//www.rcsb.org/pdb).

Stereolithography is one of several known SFF techniques. In practicing this process using equipment commonly known as Stereolithography apparatus ("SLA"), an ultraviolet laser beam selectively scans a reservoir of a of photosensitive liquid along a predetermined path. Upon the laser beam being exposed to the portions of the liquid lying in the beam's path, the exposed portions of the liquid cure or solidify through polymerization. An example of stereolithographic methods and equipment are disclosed in U.S. Pat. No. 5,256,340, which issued to Allison-on Oct. 26, 1993 and which is incorporated herein by reference.

In addition to these specifically described SFF techniques, there are-other techniques not described in detail here. Among these techniques are plasma deposition and selective laser sintering technique, both of which are additive processes whereby a solid object is created on a layer-by-layer basis.

In general, Solid Freeform Fabrication technologies depend on the use of computers to generate cross-sectional patterns representing the layers of the object being formed, and generally require the associated use of a computer and computer-aided design and manufacture (CAD/CAM) software. In general, these techniques rely on the provision of a digital representation of the object to be formed. The SLA or other apparatus for carrying out the fabrication of the object then utilizes the digital representation of the object for building the layers of the object by, for example, determining the path of the laser beam to selectively expose UV light to photosensitive liquids.

In the normal practice of SFF techniques, because objects or 'parts' being fabricating are built on a layer-by-layer basis, where each layer represents a thin cross-section of the part to be formed, is it possible to build solid objects. However, in the alternative, it is also possible to form hollow structures wherein just the periphery of the object is formed. Such a hollow structure can be formed by formation of a substantially intact boundary or skin only. The desired internal and external object geometry depends upon the anticipated usage of the object formed by the SLA and is based upon a computer generated model or representation of the object. For example, it may be desirable to produce an object with a hollow portions, solid portions and combinations thereof.

Figure 8:
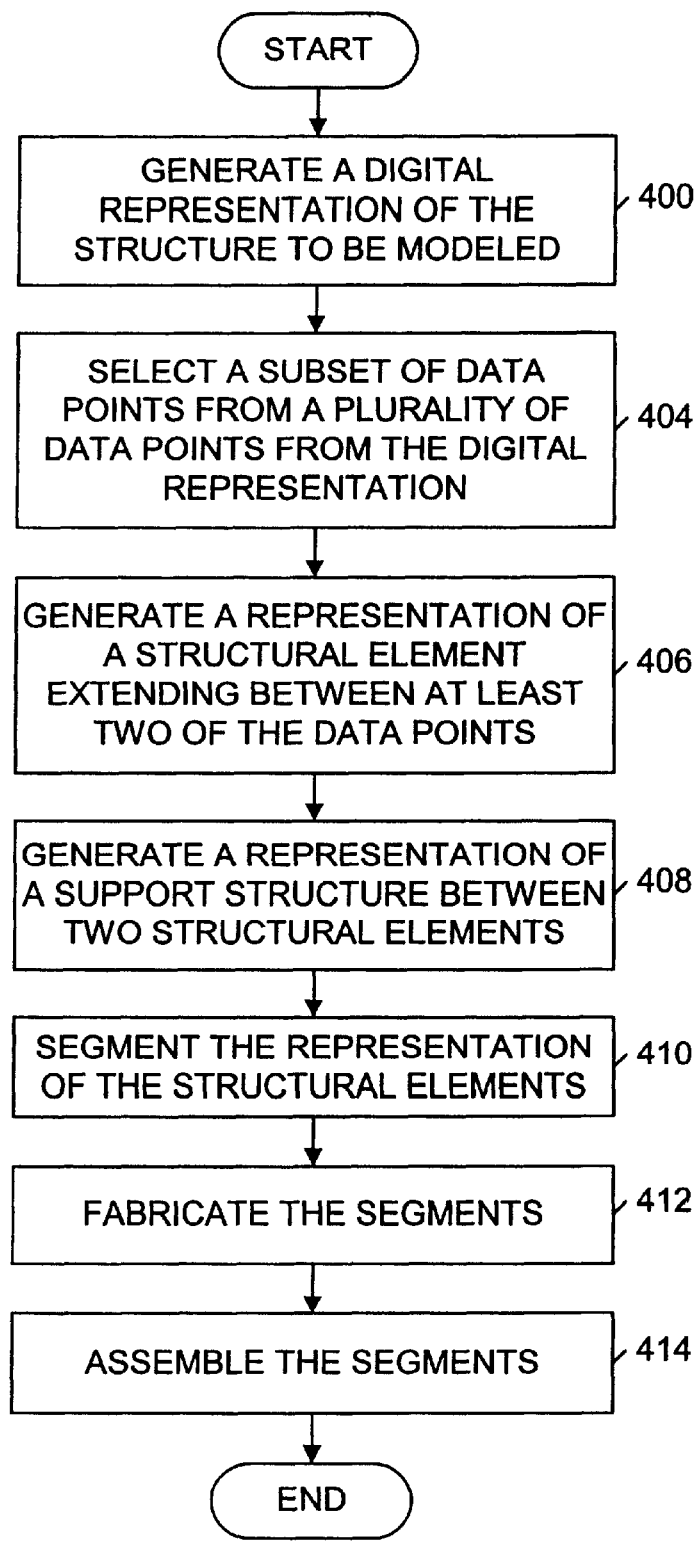
FIG. 8 is a flow chart illustrating the method of making a model of the type shown in FIG. 1.

A method using SFF techniques to produce the model 10 includes (FIG. 8) generating 400 a digital representation of the structure to be modeled, including a representation of a plurality of data points. More particularly, a suitable SLA and associated computer on which a suitable CAD application resides is loaded with a digital expression of the structure to be modeled, preferably in three-dimensional coordinates. In the case of a protein as the subject structure, digital expressions of many known proteins are available for downloading from the Protein Data Bank in a three dimensional space using a suitable CAD application.

Figure 3:
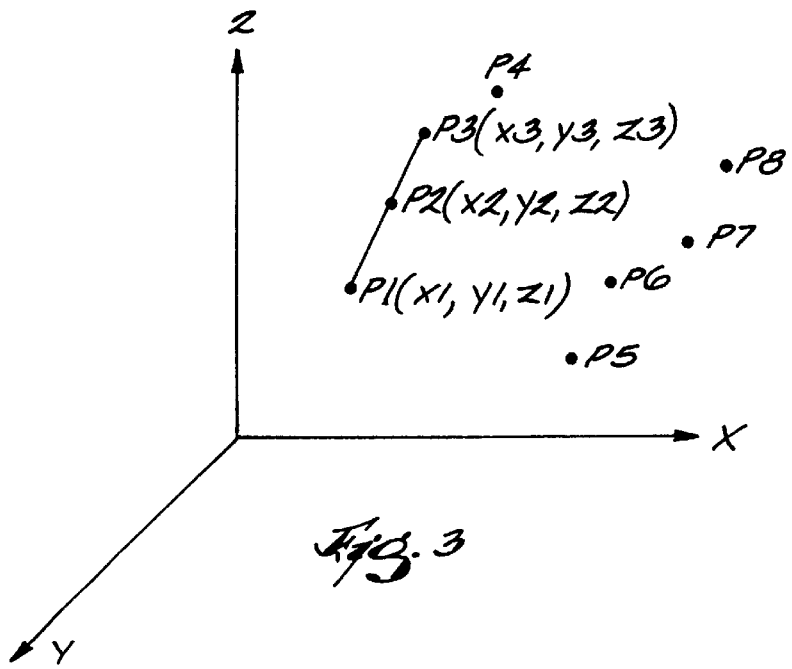
FIG. 3 is a schematic view of three-dimensional coordinates used to construct the model shown in FIG. 1.

The method of producing the model also includes selecting 404 a subset of data points from the plurality of data points available in the general digital representation of the subject structure. In particular, and as shown in FIG. 3, the subset of coordinates or data points P correlate to the selected characteristics of the structure to be modeled, such as the alpha carbons of the protein structure. Each data point of the subset of points has a respective x, y, and z coordinate. This subset of data points P is identified and separated from the general digital representation with the individual data points P being maintained in sequential order and are introduced into the CAD three-dimensional in sequential order. This subset of data points serves as a framework for a virtual representation of the subject structure. As explained below, the points P delineate paths corresponding to the chains of monomers found in the protein structure being modeled. When the model is fabricated, a strand 14 will generally lie along the path delineated by a set of points P.

The method of producing the model also includes generating 408 a representation of a structural element extending between at least two of the data points in the subset of data points. In particular, the virtual representation of the respective relative locations of the alpha carbons is extended by generating a plurality of virtual connecting segments extending between each adjacent coordinates, thus representing the covalent bond between adjacent alpha carbons. FIG. 3 illustrates this virtual connection of a plurality of data points P. For example, point P1 located at $X_1, Y_1, Z_1$, is spaced from point P2 located at $X_2, Y_2, Z_2$. A virtual segment extends along the path delineated by and extending between points P1 and P2. These virtual segments, when the model 10 is fabricated in the manner discussed below, corresponds to one of the elongated strands 14. Second and subsequent virtual segments are generated along a second path delineated by a second set of data points and correspond to second and subsequent strands 14.

Thus, as the virtual representation of the model is extended point by point through the entire subset of data points, a virtual representation of the backbone model 10 is generated in the CAD environment. Preferably this virtual representation is maintained in a the in format of a ".stl" file, a format that is commonly used in connection with SLA systems.

The method of producing the model 10 also includes generating 408 the representation of the structure, i.e., the thin legs 26 corresponding to the forces of the hydrogen bonds. In particular, from the .stl file representing the relative locations of alpha carbons and presence of covalent bonds, the coordinates corresponding to selected alpha carbons that share a hydrogen atom and therefore have therebetween a hydrogen bond are designated by pairs or end points. The CAD system is then used to generate a virtual representation of a thin leg 26 extending between the pairs of end points. The representations of this legs 26 can be maintained either in a separate .stl file representing the hydrogen bonds only or in a set of additional coordinates in the .stl file for the backbone model.

In order to fabricate the model as a integrally formed, single piece of material, the SLA is used to generate the strands 14 and connecting legs 26. While any suitable configuration of the strands 14 and connecting legs 26 can be used successfully, in the illustrated embodiment, the strands 14 are formed to have a generally tubular outer surface and a generally circular cross-section when viewed in a plane extending perpendicular to the axis of the strand. Other outer surface and cross-sectional configurations can be generated depending on the capabilities of the SLA used and the intended use of the model.

Figure 10:
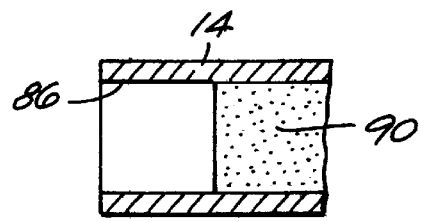
FIG. 10 is a cross-sectional view of a portion of the model shown in FIG. 1.

The strands 14 may be fabricated or built up by the SLA so as to be solid. However, in the alternative and as shown in FIG. 10, the strands 14 can also be made so as to provide a hollow tubular structure 86. The hollow strands can be left hollow, such as at hollow portion 86 or can be filled with a variety of filler materials, such as with filler material 90, depending on the intended purpose of the model. For example, multi-colored filler materials may be used for different strands 14 or portions of strands 14. Similarly, filler materials that vary the characteristics of the model 10, e.g., flexible materials, materials effecting the density or weight, or the hydrophobic or hydrophilic properties of the model may also be used as filler material 90.

The resultant model 10 is a solid free form model of a complex structure having a plurality of elements in spaced relation and forces acting on the elements. The model 10 represents the subject structure by including a plurality of strands 14 extending along a path corresponding to the location of respective elements along a path and by including a connecting leg which is integrally formed with the strands and which corresponds to the vector along which a force acts on the elements. The model is a single piece of material that accurately represents a variety of characteristics of the subject structure in a useful manner.

Figure 9:
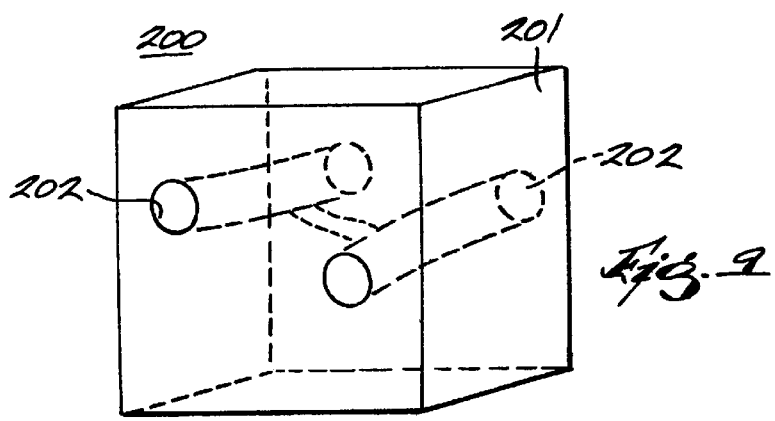
FIG. 9 is a perspective view of a model which is an alternative embodiment of the model shown in FIG. 1.

FIG. 9 illustrates a model 200 that is an alternative embodiment of the model 10. The model 200 is a reverse image of a model 10 in that the model 200 is generated through SFF techniques but defines a three space in which modeled structure resides. This three space is then formed as a solid form 201 shown in the drawings as a cube, though any configuration could be used. The solid 201 has extending therethrough a plurality of tunnels 202 which correspond to the structure of the stands 14 and connecting legs 26 in the model 10. The production of a model 200 is the same as that for model 10 in that the representing and fabricating steps are the same but result in negative images of the structure illustrated in model 10.

FIGS. 4–7 illustrate a portion of a model 99 that is an alternative embodiment of the model 10. When assembled, the model 99 is identical in appearance to the model 10, but differs from the model 10 by virtue of being capable of being disassembled. More particularly, in order to enhance the manufacturability of the model 10, the strands 14 of model 99 are segmented or divided into a plurality of segments 40 that can be independently formed and fitted together to assemble the model 99 as a whole. The subdivision of the model 99 is carried out with the intention that the respective geometries of the segments 40 will afford relatively easy manufacture by injection molding or other manufacturing process but without subdividing the model 99 into an excessive number of segments 40. For segments which have short "alpha helices" or severe turns or twists, the segments can be broken down into smaller fragments so that the geometry of each segment 40 is simplified to the point that they can be easily molded.

More particularly, the model 99 includes strands 14 that are segmented and include at least two strand segments 40. The segments 40 have respective ends 46 which are adapted to be interconnected but which also afford easy assembly and disassembly of the segments 40. The ends 46 of the segments 40 are configured so as to provide a means 50 for interconnecting the segments 40 into the model 99 as a whole without the possibility of interconnecting the segments 40 improperly so as to form an inaccurate model configuration. While any suitable means 50 for interconnecting the segments can be successfully used, in the embodiment illustrated in FIG. 4, such interconnecting means 50 includes a pair of slide connectors 58 which are integrally formed into the respective ends 46 of adjacent strand segments 40 and which are configured to cooperate in the assembly of the segments 40 into the model 99. These pairs of slide connectors 58 are oriented relative to the unique geometry of the associated segment 40 to allow casting of the segment 40 individually by one of any suitable manufacturing process, such as injection molding.

With reference to FIGS. 5 and 6, the pairs of slide connectors 58 each include a male connector 60 on the end 46 of a first segment 40 and a respective female connector 62 on the end 46 of a second segment 40. The male connector 60 provides a first engagement surface 64 which has (FIG. 5) opposed faces 66. The engagement surface 64 on the male connector is sedge shaped in that the opposed faces 66 are not uniformly spaced apart across the diameter of the segment 40. Rather, the opposed faces 66 diverge from a leading edge 68 to a trailing edge 70. Also, the male connector engagement surface 64 also defines a neck and bulb portion 72 at the end of the male connector 60.

The female connector 62 also provides a pair of engagement surfaces 74 defining an opening or slot 76 adapted to receive the male connector 60. The engagement surfaces 74 defining the opening 76 are not uniformly spaced apart. Rather, the opening diverges from a leading edge 78 to a trailing edge 80 so that the leading edge 68 of the male connector 60 can be received by the opening 76 but cannot pass through the slot 76. Similarly, the male connector 60 can be received by the female connector 62 only by having the leading edges 68, 78 of the connectors 60 and 62 aligned. The engagement surfaces 74 also receive the neck and bulb portion 72 of the male connector 60 and converge to the end 46 of the female connector 62 to prevent axial displacement of the segments 40. As discussed below, the engagement surfaces 66 and 76 of the slide connectors 58 may be uniquely configured to assure that the pairs of connectors 60 and 62 can be interconnected in only one possible arrangement. This can be done, for example, by providing unique configurations of the neck and bulb portions 72 and slots 76.

The slide connectors 58 must accurately orient one segment 40 relative to the other and provide sufficient stability to the fully assembled model 99 such that the fully assembled model 99 can be handled without falling apart unintentionally.

With reference to FIG. 7, the connecting means 50 can take a variety of forms, including pairs of male and female end connectors 80, 84 that are configured to be interconnected in a single orientation. As shown in FIG. 7, the end connectors 80, 84 include a male portion 80 on the end of a first segment 40A and a respective female connector 84 on the end of a second segment 40B. The slide connectors 80, 84 must also accurately orient one segment relative to the other and provide sufficient stability to the fully assembled model 99 such that the fully assembled model can be handled without falling apart unintentionally, and can also be configured so that only the appropriate pairs of connectors can be assembled so as assure an accurate model 99.

The model 99 also includes connecting legs 26 which represent the presence of a hydrogen bond. However, in order to make the model 99 easier to fabricate on a mass manufacturing scale, the model 99 includes connecting legs that are short, individual segments having opposite ends. The ends are received in respective recesses 48 in the segments 40. The recesses 48 are appropriately located along the length of the segments 40 to accurately represent the locations of the hydrogen bonds, and are aligned with respective recesses in adjacent strands 14 of segments 40 so that the both ends of the legs 26 are received by a recess 48.

A method of producing the model 99 includes (FIG. 8) segmenting 410 the virtual representation of the model 10. Segmenting includes identifying and generating representations of the strands 14 and the break points in the strands to generate representations of the segments 40 and connectors 58. The strand segments 40 are preferably formed through first representing the segments 40 in the CAD environment by introducing breaks in the strands 14. The breaks introduced into the protein backbone model 10 to create the individual segments 40 are preferably positioned along the length of a tubular strand 14 and between the bends A representing the location of two adjacent alpha carbons.

After the position of each break point has been determined in the virtual representation of the backbone model in the CAD environment, the break points are generated by defining pairs of slide connectors 58 on the ends of adjacent segments 40. This is preferably accomplished by generating a shape similar to the interface between the engagement surfaces 66, 74 of the end connectors 58. This particular shape of the interface unique to the specific set of connectors 58 is used as a "Boolean Separator" created in the CAD environment and positioned in the backbone at a predetermined break point. The Boolean separator is a device that eliminates the data points in the generated image of a strand 14 and defines the cooperating engagement surfaces 66, 74 of the slide connector 58. A series of Boolean operations produces two segments 40 of a strand, with each segment having an end defining a female connector 62 and an opposite end having the male connector 60.

The manufacturability of the segments 40 must be considered in defining the slide connectors 58 for each segment end 46, especially if the segments 40 are intended to eventually be manufactured by injection molding. In particular, while the male end 60 of the slide connector pair 58 can be cast in any suitable orientation with respect to the orientation of the segment 40 and the draft angles on the male engagement surfaces 66, care must be taken to properly orient the female slide connector engagement surfaces 74 relative to the path of separation of the mold used to form the segment 40 and relative to the orientation of the remaining length of the segment 40. In particular, the female slide connector 62 must be oriented so that when the segment 40 in is an injection mold, the axis of the slot 76 in the female end is parallel to the path in which the moveable mold half is removed from the fixed mold. That is, two geometrical constraints on the placement of the segment 40 in the mold must be satisfied at the same time: the slot 76 at the female slide connector 62 of the segment 40 must be parallel to the path of mold separation, and, the segment 40 must be positioned so as to allow its own unique geometry to allow mold separation. These two conditions can be met simultaneously by simply rotating the orientation of the engagement surfaces 66, 74 about the axis of the segment 40 connecting the two alpha carbons such that the axis of the slot 76 is parallel to the path of mold separation when the segment 40 is optimally positioned on the bottom mold half.

After the segments 40 of the model 99 are virtually represented, the method of producing the model 99 includes (FIG. 8) fabricating 412 the segments 40. This fabricating step includes initially fabricating the segments of the model 99 through the use of Stereolithography (SLA) to produce the plurality segments 40. Thereafter, method for producing the model 99 includes (FIG. 8) assembling 414 the backbone segments 40 with the end connectors 58 and the connecting legs 26 in the recesses 48 into the final model 99. When so assembled with SLA fabricated parts, the model 99 provides an opportunity to evaluate the model and to assure the accuracy and representation of the model 99. Any modifications in the parts of the model 99 can then be carried out before manufacturing tooling is fabricated. Once the model segments 40 are properly configured, then the method of producing the model 99 includes fabricating the tooling for mass manufacture of the model segments 40 by, for example, injection molding and assembling the mass produced segments.

Various features of the invention are set forth in the following claims.

What is claimed is:

1. A method of producing a model of a protein, the protein having an amino acid backbone, the amino acid backbone including a plurality of alpha carbon atoms, the method comprising:

generating a digital representation of the protein, the digital representation including
a plurality of data points, the plurality of data points representing the plurality of alpha carbon atoms; and
a plurality of connecting segments between the plurality of data points, the plurality of connecting segments representing the amino acid backbone, and the plurality of connecting segments having an elongated tubular shape;

segmenting the digital representation of at least one of the plurality of connecting segments into a first amino acid backbone segment and a second amino acid backbone segment;

forming a male engagement surface on the first amino acid backbone segment and a female engagement surface on the second amino acid backbone segment, the male engagement surface and the female engagement surface engaging in a single orientation preventing axial displacement about the amino acid backbone so that the model cannot be assembled incorrectly; and producing a model of the protein by inputting the digital representation of the protein into a rapid prototyping machine.

2. The method of claim 1 wherein producing a model of the protein by inputting the digital representation of the protein into a rapid prototyping machine includes inputting the digital representation of the protein into one of a Stereolithography machine, a selective laser sintering machine, and a fused deposition modeling machine.

3. The method of claim 1 wherein generating a digital representation of the protein includes providing a numerical three-dimensional description of the protein, the numerical three-dimensional description including the plurality of data points representing the plurality of alpha carbon atoms.

4. The method of claim 1 wherein generating a digital representation of the protein includes generating at least one connecting leg representing a hydrogen bond and coupled between two of the plurality of connecting segments.

5. The method of claim 1 wherein generating a digital representation of the protein includes generating at least one branch representing a side chain and extending from at least one of the plurality of connecting segments.

6. The method of claim 1 wherein generating a digital representation of the protein includes generating at least one spherical member representing one of a substrate and an inhibitor and coupled to at least one of the plurality of connecting segments.

7. The method of claim 1 wherein generating a digital representation of the protein includes generating a group of at least one branch representing a side chain coupled to at least one spherical member representing one of a substrate and an inhibitor, the group being coupled to at least one of the plurality of connecting segments.

8. A method of producing a model of a protein, the protein having a amino acid backbone, the amino acid backbone including a plurality of alpha carbon atoms, the method comprising:

generating a digital representation of the protein, the digital representation including
a plurality of data points representing a plurality of alpha carbon atoms, and
a plurality of connecting segments between the plurality of data points, the plurality of connecting segments representing the amino acid backbone, the plurality of connecting segments having an elongated tubular shape;

segmenting the digital representation of at least one of the plurality of connecting segments into a first amino acid backbone segment and a second amino acid backbone segment;

forming a male engagement surface on the first amino acid backbone segment and a female engagement surface on the second amino acid backbone segment, the male engagement surface and the female engagement surface engaging in a single orientation preventing axial displacement about the amino acid backbone;

fabricating the model of the protein by inputting the digital representation of the protein into a rapid prototyping machine; and assembling the first amino acid backbone segment and the second amino acid backbone segment according to the single orientation of the male engagement surface and the female engagement surface in order to accurately assemble the model of the protein.

9. The method of claim 8 wherein fabricating the model of the protein by inputting the digital representation of the protein into a rapid prototyping machine includes inputting the digital representation of the protein into one of a Stereolithography machine, a selective laser sintering machine, and a fused deposition modeling machine.

10. The method of claim 8 wherein generating a digital representation of the protein includes generating at least one connecting leg representing a hydrogen bond and coupled between two of the plurality of connecting segments.

11. The method of claim 8 wherein generating a digital representation of the protein includes generating at least one branch representing a side chain and extending from at least one of the plurality of connecting segments.

12. The method of claim 8 wherein generating a digital representation of the protein includes generating at least one spherical member representing one of a substrate and an inhibitor and coupled to at least one of the plurality of connecting segments.

13. The method of claim 8 wherein generating a digital representation of the protein includes generating a group of at least one branch representing a side chain coupled to at least one spherical member representing one of a substrate and an inhibitor, the group being coupled to at least one of the plurality of connecting segments.

* * * * *